(12) United States Patent
Minta et al.

(10) Patent No.: US 7,910,629 B2
(45) Date of Patent: Mar. 22, 2011

(54) LIGHT ENDS RECOVERY PROCESS FOR A GTL PLANT

(75) Inventors: Moses K. Minta, Missouri City, TX (US); Edward L. Kimble, Sugar Land, TX (US); Russ H. Oelfke, Houston, TX (US); Eric D. Nelson, Houston, TX (US); Ross Mowrey, Houston, TX (US); Albrecht Goethe, Seabrook, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 635 days.

(21) Appl. No.: 11/904,000

(22) Filed: Sep. 25, 2007

(65) Prior Publication Data
US 2008/0096985 A1 Apr. 24, 2008

Related U.S. Application Data

(60) Provisional application No. 60/853,486, filed on Oct. 20, 2006.

(51) Int. Cl.
*C07C 27/00* (2006.01)
(52) U.S. Cl. ......... 518/705; 518/702; 518/703; 518/704

(58) Field of Classification Search .................. 518/702, 518/703, 704, 705
See application file for complete search history.

(56) References Cited

U.S. PATENT DOCUMENTS

| | | | |
|---|---|---|---|
| 2,672,402 | A | 3/1954 | Stokes |
| 6,656,978 | B2 | 12/2003 | Shiroto et al. |
| 2002/0032244 | A1 | 3/2002 | Benham et al. |
| 2002/0120017 | A1 | 8/2002 | Bohn et al. |
| 2003/0083390 | A1 | 5/2003 | Shah et al. |
| 2006/0135629 | A1 | 6/2006 | Abbott et al. |

OTHER PUBLICATIONS

"The Mossgas Challenge", International Journal of Hydrocarbon Engineering, V2, N. 2, Mar.-Apr. 1997, pp. 2-4.

*Primary Examiner* — Jafar Parsa
(74) *Attorney, Agent, or Firm* — Derek Kato; Joseph J. Duorak

(57) ABSTRACT

The GTL process of the invention comprises: reacting a combustible carbonaceous material in a syngas reactor, preferably an autothermal reformer, under conditions to produce a synthesis gas; contacting the synthesis gas with an F-T catalyst to form liquid products and a tail gas; separating the tail gas from the liquid products; separating $CO_2$ from the light products in the tail gas; recovering the light products as additional products for sale or other use and utilizing at least a portion of the separated $CO_2$ as a feed stream to the syngas reactor.

15 Claims, 7 Drawing Sheets

LIGHT ENDS RECOVERY PROCESS FOR A GTL PLANT

This application claims priority of Provisional Application 60/853,486 filed Oct. 20, 2006.

FIELD OF THE INVENTION

The present invention relates generally to the conversion of a hydrocarbon containing gaseous feed into liquid products, such conversion often being referred to as a gas to liquid (GTL) process. More particularly, the invention relates to a system and process for the improvement in the utilization of the tail gas product from a GTL process.

BACKGROUND OF THE INVENTION

The synthetic production of liquid fuels, lubricants, alcohols, alcohol derivatives, and other oxygenates from natural gas or other sources of synthesis gas (syngas) is well known and commonly called a gas to liquid (GTL) process. Basically, a carbonaceous material is first converted into a gas comprising carbon monoxide and hydrogen, i.e., syngas. Then the syngas is catalytically converted into liquid products via the well known Fischer-Tropsch process.

Processes for gasifying carbonaceous material into syngas are known in the industry. Three basic methods have been heretofore employed. These are: (1) the steam reforming of one or more light hydrocarbons such as methane over a catalyst; (2) the sub-stoichiometric partial oxidation of one or more light hydrocarbons; and (3) the combination of partial oxidation and steam reforming known as autothermal reforming.

Autothermal reforming has the advantage that the heat generated by the partial oxidation process is used to supply the heat necessary for the endothermic steam reforming reaction. Additionally, the autothermal process results in a lower hydrogen to carbon monoxide ratio in the syngas than does steam reforming alone. It is known that the $H_2/CO$ stoichiometric ratio for the F-T process is approximately 2:1, but there are many reasons for using other than a stoichiometric ratio. Steam ($H_2O$) and $CO_2$ can be added to the feed of any of the three syngas processes to modify the product $H_2/CO$ ratio. Additional steam increases the $H_2/CO$ ratio, while additional $CO_2$ reduces the ratio.

The reaction products obtained in an F-T process depend upon the reaction conditions and catalyst employed. For example, high reaction temperatures favor the formation of alcohols, alcohol derivatives like ethers, and other oxygenates. Low reaction temperatures favor the formation of paraffinic liquid hydrocarbons and waxes. In either case, the product stream typically also includes, unreacted syngas, water and other gases such as $CO_2$ and $N_2$. The hydrocarbons and water are separated leaving a tail gas typically containing unreacted syngas, $CO_2$, $N_2$, Ar, gaseous desired products and water vapor. The $N_2$ and Ar are typically present in either the feed gas or the oxygen fed to the autothermal reformer. The tail gas may be used as a fuel for the GTL plant, or part of the tail gas may be used as a source of $CO_2$ for the autothermal reformer. For either use, the composition of the tail gas is substantially less than optimal due to the presence of the $N_2$ and Ar species which dilute the concentration of the reactants leading to larger equipment, and in the case of $N_2$ may form undesirable HCN and $NH_3$ by-products during reforming.

SUMMARY OF THE INVENTION

The present invention is concerned with the recovery of gaseous hydrocarbons (light ends) from the tail gas from the F-T reactor of a gas-to-liquid (GTL) plant and the provision of a process gas stream for use in the GTL plant.

In one aspect of the invention, a GTL process comprises: reacting a combustible carbonaceous material in a syngas reactor, preferably an autothermal reformer, under conditions to produce a synthesis gas; contacting the synthesis gas with an F-T catalyst to form liquid products and a tail gas; separating the tail gas from the liquid products; separating $CO_2$ from the light products in the tail gas; recovering the light products as additional products for sale or other use and utilizing at least a portion of the separated $CO_2$ as a feed stream to the syngas reactor.

In another aspect of the invention, the process is used to extract $CO_2$ from the tail gas for sequestration. This reduces the net greenhouse gas emissions from the GTL plant.

Other aspects of the invention will become apparent upon a reading of the detailed description which follows.

DETAILED DESCRIPTION OF THE INVENTION

Figure 1:
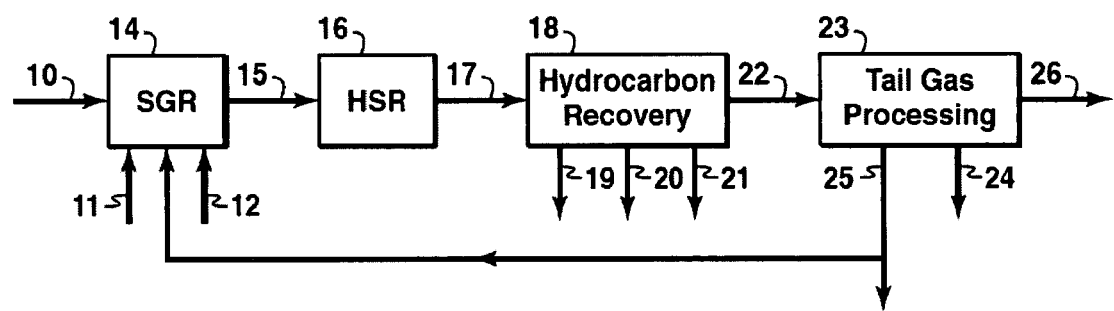
FIG. 1 is a block diagram illustrating aspects of the invention.

For convenience, the invention will be described with particular reference to an integrated autothermal reforming and F-T hydrocarbon synthesis process for producing liquid products, such as liquid fuel and lubricants. However, the invention is equally applicable to other variants of the F-T process, such as those for producing alcohols, especially methanol and other oxygenates.

In the integrated autothermal reforming and F-T synthesis process, the feed for the autothermal reforming step typically comprises gaseous light hydrocarbons such as methane. Depending upon the composition and physical nature of the feed, it may be pre-treated, if necessary, to remove any impurities in the feed. However, $N_2$ is an impurity typically not removed, if present at acceptably low levels. After any pre-treatment, the hydrocarbon feed is sent to the autothermal reformer to be reacted therein with steam and an oxygen-containing gas such as air. Depending on the application, preferably, the oxygen used will be a substantially pure oxygen stream produced in an air separation unit, but may contain some atmospheric argon and nitrogen, depending on the air separation process utilized.

The autothermal reforming process typically is carried out at temperatures in the range of about 1,750° F. (955° C.) to about 2,000° F. (1,090° C.) at pressures up to about 800 psig (5,520 kPa). The hot gaseous product formed in the autothermal reforming process, syngas, contains carbon monoxide and hydrogen which are the key reactants in the F-T hydrocarbon synthesis step.

Typically, the hot syngas from the autothermal reformer is subjected to cooling and cleaning to remove excess water, ammonia, and other impurities. Then the syngas is sent to the F-T reactor where it is contacted with a hydrocarbon synthesis catalyst.

The mole ratio of hydrogen to carbon monoxide in the syngas may range from about 0.5:1 to 4:1 but is more typically within the range of about 0.7:1 to 2.75:1 and preferably from 0.7:1 to 2.5:1.

As is well known, in the F-T synthesis process, the catalyst may be in the form of a fixed bed, a fluidized bed or a slurry of catalyst particles in a hydrocarbon slurry liquid. While suitable F-T catalysts comprise one or more Group VIII metals, such as Fe, Ni, Co, Ru and Re, in the present invention it is preferred that the catalyst comprises a cobalt catalytic component. Useful catalysts and their preparation are known, and illustrative examples may be found in U.S. Pat. Nos. 4,568,663; 4,663,305; 4,542,122; 4,621,072 and 5,545,674.

Typical F-T process conditions in a slurry process employing a supported cobalt-containing catalyst include temperatures, pressures and hourly gas space velocities in the range of about 320° F. to 850° F. (160° C. to 454° C.) 80 psia to 600 psia (550 kPa to 4136 kPa) and 100 to 40,000 V/hr/V, expressed as standard volumes of the gaseous CO and $H_2$ mixture (0° C., 1 atm) per hour per volume of catalyst, respectively.

The composition of the product of the F-T hydrocarbon synthesis process will depend upon many factors, such as the catalyst used and the process conditions. Typically, the product will include paraffinic and olefinic hydrocarbons from $C_1$ to $C_{200}$ and higher, varying amounts of carbon dioxide, water and oxygenates such as alcohols, aldehydes, ketones and esters.

The F-T product streams are commonly separated into separate streams of tail gas, liquid hydrocarbons and waste water. The desired product of the F-T process is the liquid hydrocarbon. These typically have hydrocarbon chains of from $C_5$ to $C_{200}$ and higher.

The F-T tail gas stream is the gaseous stream that does not condense when the reaction products are cooled. Typically, the tail gas stream contains CO, $H_2$, $CO_2$, $H_2O$, $N_2$, Ar and $C_1$ to $C_5$ hydrocarbons.

One aspect of the present invention is the recovery of the light ends from the tail gas stream. This is achieved by first dehydrating the tail gas stream to provide a dry gas stream and thereafter fractionating the dry gas stream into at least light ends ($C_3$ and heavier) which are recovered and a gas stream containing methane, ethane, ethylene, $H_2$, CO and $CO_2$, $N_2$, and Ar. Another aspect of the present invention is the recovery of a $CO_2$-rich gas stream from the tail gas, at least a portion of which is used as feed in the autothermal reformer. It is desirable to separate the $N_2$ and Ar from the $CO_2$ sent to the autothermal reformer and return a $CO_2$-rich stream, since these gases are inerts in the process and reduce production efficiency while increasing the required equipment size and nitrogen may react to form undesirable by-products.

The $CO_2$ is fed into the autothermal reformer to help control the syngas $H_2/CO$ ratio. It acts as a counterbalance to $H_2O$ (steam) in the feed gas. Increasing $CO_2$ and/or decreasing $H_2O$ will tend to decrease the syngas $H_2/CO$ ratio. Conversely, decreasing the $CO_2$ and/or increasing the $H_2O$ will tend to increase the $H_2/CO$ ratio. Using $CO_2$ and $H_2O$ in this way is a highly efficient method of controlling syngas chemistry. Precise control over the syngas chemistry is necessary for most efficient operation of the F-T reaction.

In the process of the present invention, the tail gas is dehydrated by compressing the gas and cooling the compressed gas to temperatures and pressures sufficient to result in the separation of water and any hydrocarbon liquids in the tail gas. Typical temperatures and pressures are in the range of about 50° F. (10° C.) to about 100° F. (38° C.) and about 225 psig (1650 kPa) to about 1,100 psig (7,686 kPa). The condensed liquids are then separated from the gas, thereby providing a dehydrated tail gas stream. At this step, the gas should not be cooled below the hydrate formation temperature.

Alternatively or in addition, the tail gas can be further dehydrated by passing the gas through an adsorbent such as a molecular sieve, by use of a membrane separator, or with a desiccating agent such as triethylene glycol or calcium chloride. Optionally, the dehydrated tail gas stream may be subjected to other polishing steps to assure substantially complete removal of water from the stream. Any typically used natural gas dehydration technique can be used to dehydrate the tail gas, as is known to those skilled in the art.

To recover the light ends from the dehydrated tail gas stream, the dry gas is cooled to a temperature in the range of about −50° F. (−46° C.) to about 32° F. (0° C.) and at a pressure of about 225 psig (2,760 kPa) to about 1,100 psig (7,580 kPa), with the conditions chosen to liquefy adequate $CO_2$ for the desired production rate. The cooled mixture is then delivered to a first fractionation column to separate any inert gases such as $N_2$ and Ar in the dry tail gas from the liquid $CO_2$ and light ends. The liquid $CO_2$ and light ends are then delivered to a second fractionation column to separate the $CO_2$ from the light ends. The light ends then are recovered for sale or other use. For example, in one embodiment of the invention, a portion of the light ends is recycled to the first fractionating column to increase the efficiency of the operation of the first fractionating column.

In another embodiment of the invention, at least a portion of the separated $CO_2$ rich gas stream is used as a feed gas in the autothermal reformer.

In yet another embodiment of the invention, the inert, $H_2$ and CO containing gases from the first fractionating column are used as fuel for the GTL plant.

In a preferred embodiment of the invention, the low-temperature refrigeration required for the separation of the inert gases in the fractionating column is provided by work-producing gas expanders in an auto-refrigeration process. The inert gases are lower-boiling point gases than the $CO_2$ and the light hydrocarbons, and therefore vaporize more easily and separate out in the first fractionating column. The excess refrigeration produced by the work-producing expanders is used to provide supplemental cooling to the process stream feeding the fractionating column. Further, the work produced by the expanders is used to provide the work required to compress the process stream at the front-end of the process thereby enhancing the dehydration step of the process. The full integration of both thermal and mechanical energy in the process enhances overall performance, minimizing external energy requirement.

The process and system of the invention will now be described by reference to the accompanying figures. Turning first to the FIG. 1 flow sheet, a carbonaceous fuel 10, steam 11 and an oxygen-containing stream 12 are reacted in a syngas generation reactor 14 to produce a syngas stream 15, which is delivered to the hydrocarbon synthesis reactor 16 (an F-T reactor, for example). The product 17 of the hydrocarbon synthesis reactor 16 is then delivered to the hydrocarbon recovery unit 18, where the product is separated into water and oxygenates 19, liquid hydrocarbons 20, waxes 21 and tail gas 22. Tail gas 22 is then sent to the tail gas processing system 23 for recovery of light ends 24, a $CO_2$ rich gas stream 25 and a residual stream 26 which may contain inert gases, $H_2$ and CO. At least a portion of the $CO_2$ rich gas stream 25 is introduced as a feed in the syngas generation reactor 14 for control of the reaction chemistry. The syngas generation reactor 14 is preferably an autothermal reactor but may be part of any of several reforming technologies used to produce syngas in which a $CO_2$ stream is needed, such as steam methane reforming in combination with a partial oxidation system. Further, the hydrocarbon synthesis reactor (HSR) (16) is representative of synthesis reactors such as F-T reactor or methanol synthesis reactor, as is known to those skilled in the art. The residual gas stream 26 may be used as a low BTU fuel for the GTL plant.

Figure 2A:
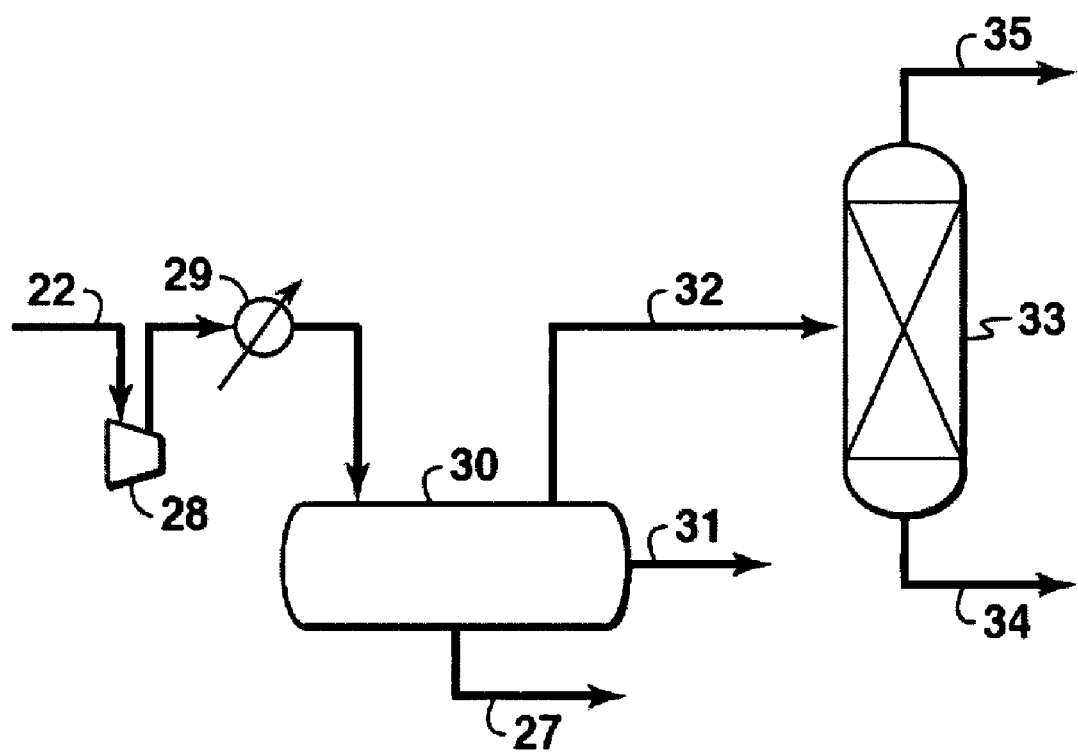
FIGS. 2A, 2B, 3A, 3B, 4 and 5 are schematic diagrams illustrating preferred embodiments of the invention.
Figure 2B:
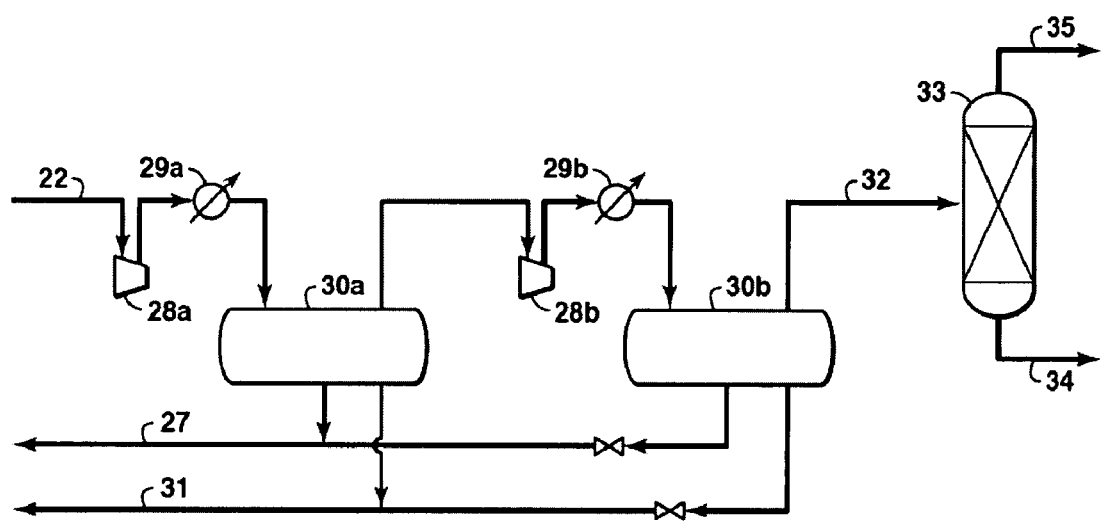

The tail gas processing system 23 will be described as comprising two stages: a dehydration stage and a product separation stage. Turning first to the dehydration stage, as shown in FIG. 2A, the tail gas 22 is compressed in compressor 28 and cooled in cooler 29 and delivered to a separation unit 30 for separation into water 27, hydrocarbon liquids 31 and a tail gas stream 32. While only a single compressor is shown, it should be understood that the compression may be done in stages and that the power for the compressors may be provided by expanders. Further, the cooling system 29 may consist of several cooling sources including water or air, external refrigeration such as propane-based unit, and/or cold streams from other parts of the process. The dry tail gas 32 optionally may be subjected to a final polishing step in dehydrator 33 where any residual water 34 is removed from the tail gas 32 to provide the tail gas stream 35. Dehydrator 33 may comprise a vessel containing one or more suitable molecular sieves for drying the tail gas stream. FIG. 2B is an embodiment of the dehydration stage in which the bulk water separation is accomplished in two stages. As can be seen, the components have the same reference numerals as in FIG. 2A except that the reference numerals for compressors, coolers and separation units include an "a" and a "b" in the first and second stages respectively.

Figure 3A:
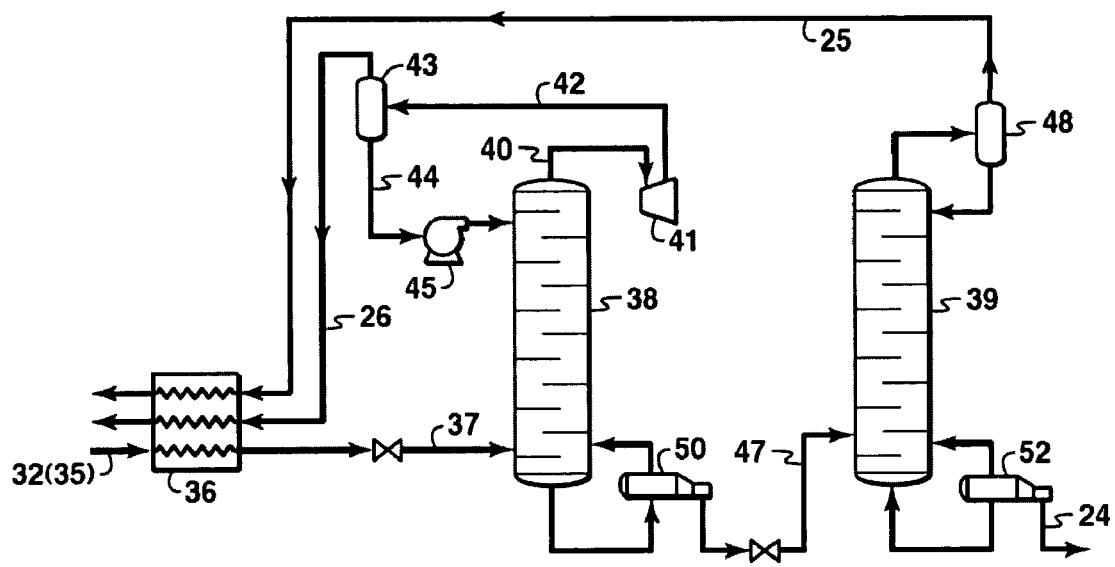

Referring now to the product separation stage and specifically to FIG. 3A, the dehydrated tail gas 32 or 35 is cooled in heat exchange unit 36 (a multi-stream heat exchanger that may or may not include external refrigerant) and then introduced via line 37 into first fractionation column 38 which functions as an inert gas rejection column. Column 38 primarily removes inert gases, $H_2$ and CO to a desired level leaving a liquid stream rich in the light ends and $CO_2$. The cooling required in the heat exchange unit 36 may be provided by an external refrigeration source such as propane refrigeration unit, by auto-refrigeration provided by expanding the gas from the top of the inert gas rejection column 38, or by other cold streams available in other parts of the process. The liquid stream from the bottom of the inert gas rejection column 38, consisting primarily of light ends and $CO_2$ is transferred via line 47 to second fractionation column 39, the product recovery column, which separates the stream into a $CO_2$-rich gas stream 25 and a liquid product stream 24, rich in light hydrocarbon components. Preferably, at least a portion of the $CO_2$ rich gas stream 25 is used to provide supplemental cooling in heat exchange unit 36 and then delivered as a feed to the synthesis gas reactor as shown in FIG. 1.

Figure 3B:
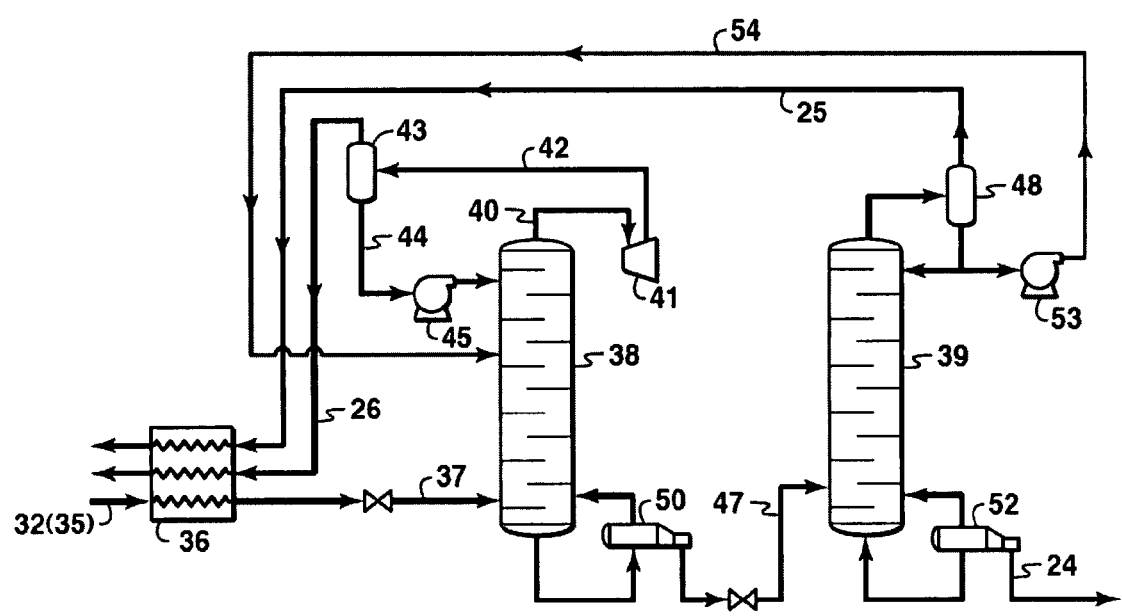

As shown in FIG. 3A, the gas stream 40 from the top of the column 38 may be expanded in a work-producing device such as expander 41 and delivered via line 42 to separator 43. The resulting liquid from the expansion device is returned via line 44 and pump 45 as reflux to column 38 while the residual gas stream 26 is optionally used for supplemental cooling in heat exchange unit 36 and ultimately used as fuel in the GTL plant. Columns 38 and 39 may be provided with reboilers 50 and 52 respectively for recycling a portion of liquid stream to their respective fractionating columns. Column 39 may also be provided with a condenser 48 for recycling a portion of the stream back to the column. FIG. 3B is an embodiment of the product separation stage in which the product recovery column 38 provides supplemental reflux stream 54 to the inert gas rejection column.

Those skilled in the art will appreciate that there are many variations within this embodiment including, but not limited to, the following: the inlet to the inert gas rejection column may be expanded using a work-producing device to produce stream 37; expansion of the gas stream from the top of the inert gas rejection column may be done in two stages to prevent the potential for $CO_2$ solid formation; an additive stream may be injected to the dehydrated tail gas 32 (35) to enhance the separation processes in the columns and the additive may be recovered subsequently from stream 24.

Figure 4:
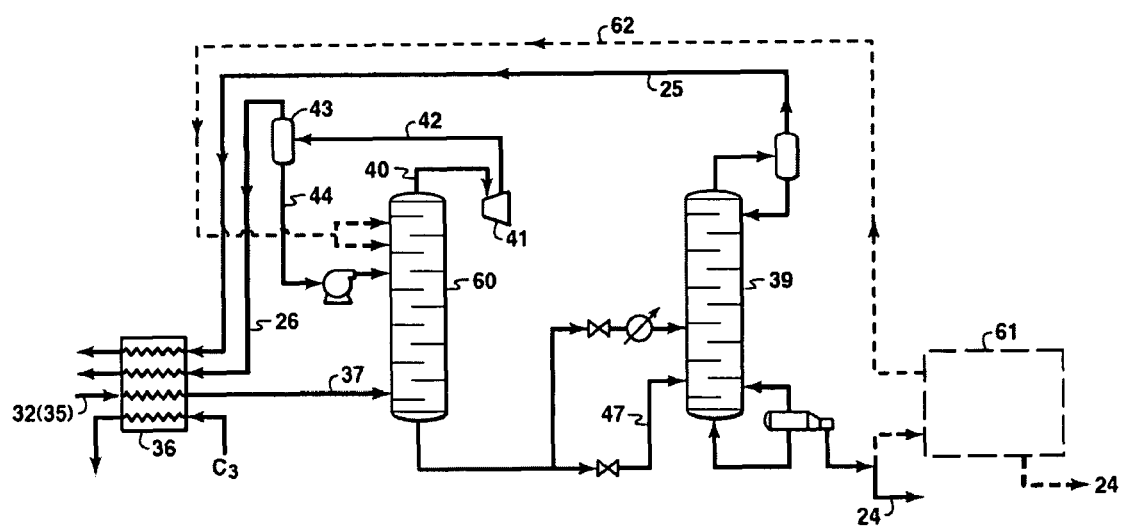

FIG. 4 shows an alternate embodiment of the invention in which the first fractionation column 60 is a high pressure absorber. In this embodiment, side rectifiers, not shown, may be added to the second column 39. Several other optional variations may be practiced depending upon operating conditions and composition of the tail gas. For example, all of the light ends 24 may be recovered and used or sold. Optionally, a portion of the light ends may be recovered while another portion may be recycled via line 62 to column 60. In yet another option, the light ends 24 may be further treated in a treatment step 61 comprising, for example, a side stripper or a plurality of side strippers such as provided in Ryan-Holmes type process equipment. In this option, all of the upgraded light ends may be recovered or only a portion recovered for sale or other use with a portion recycled via line 62 to the first column 60.

Figure 5:
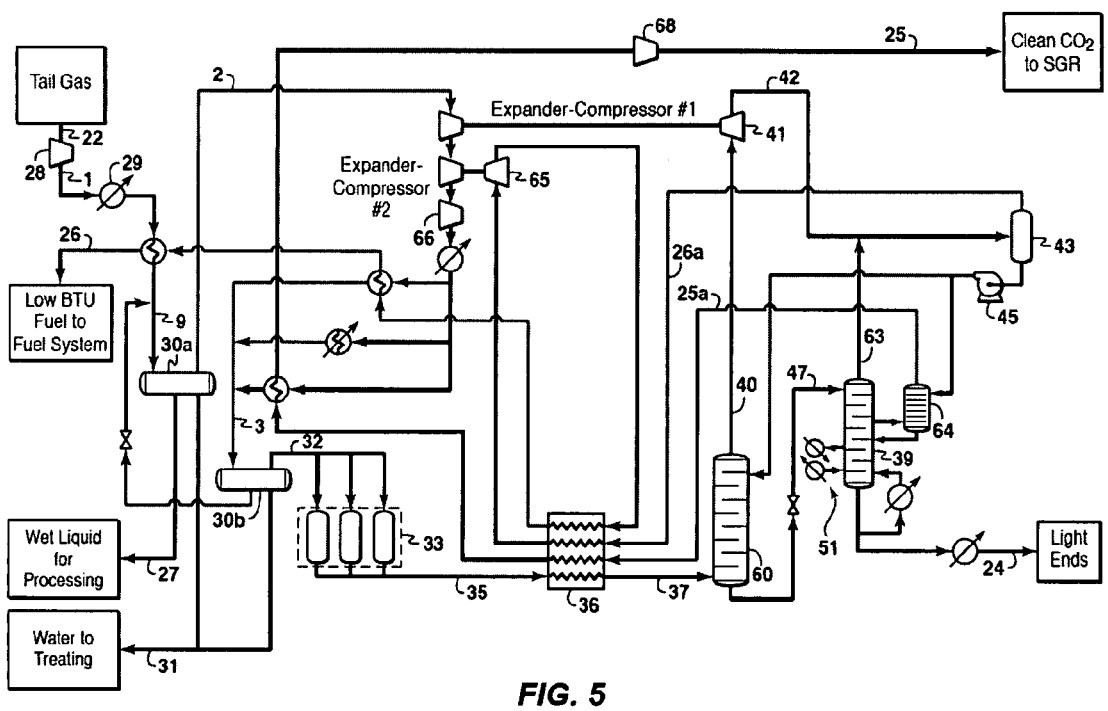

FIG. 5 shows an especially preferred embodiment of the invention. In this embodiment, the dehydration stage consists of two separators, 30a and 30b, coupled for bulk liquids separation, followed by a molecular sieve dehydration unit 33. In the embodiment, the first fractionation column 60 is a high pressure absorber. The second fractionation column 39 is provided with a side rectifier 64 for returning some liquid to column 39 to enhance operating efficiency of that column. The low BTU fuel gas 26 and the $CO_2$ rich gas stream 25 are used in the embodiment to provide supplemental cooling for the feed gas 22 being dehydrated in 30a and 30b respectively. Further, power for the compression requirements of the process is partially provided by the process expanders 41 and 65.

Optional features include the use of a compressor 68 for compressing the $CO_2$ rich stream 25 fed to the syngas generation reactor, a compressor 28 for compressing feed gas 22 prior to dehydration, and a compressor 66 in the feed gas circuit for process control flexibility.

Table 1 below shows the processing conditions for various state points identified in FIG. 5. These processing conditions were determined using the commercial process simulation software sold under the trade name Aspen HYSYS by Aspentech, Cambridge, Mass.

TABLE 1

| State Point | Pressure (kPa) | Temperature (° C.) | Flow Rate (kgmole/hr) |
| --- | --- | --- | --- |
| 22 | 1724 | 48.9 | 29990 |
| 1 | 3668 | 127.6 | 29990 |
| 9 | 3599 | 44.6 | 30630 |
| 3 | 6832 | 23.7 | 30220 |
| 35 | 6728 | 24.8 | 29470 |
| 37 | 5964 | −31.6 | 29470 |
| 47 | 3068 | −37.4 | 6327 |
| 40 | 5929 | −34.8 | 24310 |
| 24 | 3068 | 135.4 | 895 |
| 25 | 3634 | 65.6 | 4309 |
| 26 | 660 | 45.7 | 15380 |
| 27 | 3599 | 44.6 | 296 |
| 31 | 3599 | 44.6 | 198 |

What is claimed is:
1. A GTL process comprising:
(a) reacting a carbonaceous material in a syngas generation reactor under conditions to produce a synthesis gas;

(b) contacting the synthesis gas with a Fischer-Tropsch catalyst under conditions to form liquid hydrocarbon products and a tail gas containing light ends and $CO_2$;
(c) separating the liquid hydrocarbon products from the tail gas;
(d) dehydrating the separated tail gas and fractionating the dehydrated tail gas to separate the $CO_2$ from the light ends;
(e) recovering the separated light ends; and
(f) utilizing at least part of the separated $CO_2$ as a feed in the syngas generation reactor.

2. The process of claim 1 wherein the tail gas is dehydrated by compressing the gas to a pressure of about 1650 kPa to about 7700 kPa and cooling to a temperature in the range of about 10° C. to about 38° C.

3. The process of claim 2 wherein the dehydrated tail gas is fractionated in a first fractionation column to remove inert gases, thereby providing a liquid with reduced inert gases content and thereafter fractionating the liquid of the first fractionation column in a second fractionating column to separate $CO_2$ from the light ends.

4. The process of claim 3 wherein the dehydrated tail gas is first cooled to a temperature in the range of about −46° C. to about 0° C. and at a pressure of about 2,760 kPa to about 7,580 kPa.

5. The process of claim 4 wherein the first fractionating column is a high pressure absorber.

6. The process of claim 5 wherein a portion of the liquid fractionated in the second fractionation column is returned to the second column in an amount sufficient to increase the operating efficiency of the column.

7. The process of claim 6 including recycling a portion of the light ends of step (e) to the high pressure absorber.

8. The process of claim 5 or 6 including utilizing the separated $CO_2$ as a cooling stream before feeding it to the syngas generation reactor.

9. The process of claim 8 wherein the syngas generation reactor is an autothermal reformer.

10. The process of claim 8 wherein at least part of the separated $CO_2$ rich stream is sequestered.

11. In an F-T synthesis process wherein a synthesis gas is contacted with a catalyst under conditions sufficient to produce liquid products and a tail gas containing inert gases, $CO_2$ and gaseous hydrocarbons (light ends) and wherein the liquid products are separated from the tail gas and recovered, the improvement comprising:
dehydrating the separated tail gas;
fractionating the dehydrated tail gas in a first fractionation column to remove inert gases;
fractionating the balance of the tail gas to separate $CO_2$ from gaseous hydrocarbons; and
recovering the gaseous hydrocarbons (light ends).

12. The improvement of claim 11 including feeding at least a portion of the separated $CO_2$ to a syngas generation reactor operated under conditions sufficient to produce a synthesis gas.

13. The improvement of claim 12 wherein the syngas generation reactor is an autothermal reformer.

14. The improvement of claim 13 wherein the first fractionating column is a high pressure absorber.

15. The improvement of claim 14 wherein a portion of the recovered light ends is recycled to the high pressure absorber.

* * * * *